US005224722A

United States Patent [19]

Kempf

[11] Patent Number: 5,224,722

[45] Date of Patent: Jul. 6, 1993

[54] LEAF CHAIN DRIVE ASSEMBLY

[75] Inventor: Dale Kempf, Modesto, Calif.

[73] Assignee: Hogan Mfg., Inc., Escalon, Calif.

[21] Appl. No.: 629,117

[22] Filed: Dec. 17, 1990

[51] Int. Cl.[5] ........ B60P 1/44

[52] U.S. Cl. ........ 280/166; 414/545; 474/157

[58] Field of Search ........ 280/166; 414/545, 540, 414/921; 105/474, 444; 187/9 R; 474/153, 155, 157, 226, 232, 233, 235, 149, 201

[56] References Cited

U.S. PATENT DOCUMENTS

| | | | |
|---|---|---|---|
| 880,988 | 3/1908 | Hall | 474/226 |
| 1,956,942 | 5/1934 | Belcher et al. | 474/157 |
| 2,154,107 | 4/1939 | Nystrom | 105/447 |
| 3,805,630 | 4/1974 | Cornair et al. | 74/89.21 |
| 4,058,021 | 11/1977 | Wood | 74/229 |
| 4,058,228 | 11/1977 | Hall | 280/166 |
| 4,081,055 | 3/1978 | Johnson | 182/2 |
| 4,197,766 | 4/1980 | James | 74/611 |
| 4,273,498 | 6/1981 | Dickhart | 280/166 |
| 4,503,722 | 3/1985 | Suzuki et al. | 74/96 |
| 4,526,251 | 7/1985 | Johannson | 187/9 |

OTHER PUBLICATIONS

Morse Power Transmission Products Catalogue, Copyright 1981 by Morse Chain Div. p. A-6.

*Primary Examiner*—David M. Mitchell
*Attorney, Agent, or Firm*—Christensen, O'Connor, Johnson & Kindness

[57] ABSTRACT

A leaf chain drive assembly (20) designed for use with a platform lift of the type disclosed in U.S. Pat. No. 4,058,228. Leaf chains (72, 120, 208) are used in place of roller chains for transmitting rotational drive between spaced sheaves (50, 60). Each sheave contains a unique projecting lug (52, 54) designed to engage a correspondingly sized connecting link (122) in the associated leaf chain (120) so as to permit drive to be transmitted between the leaf chain and the associated sheave.

5 Claims, 2 Drawing Sheets

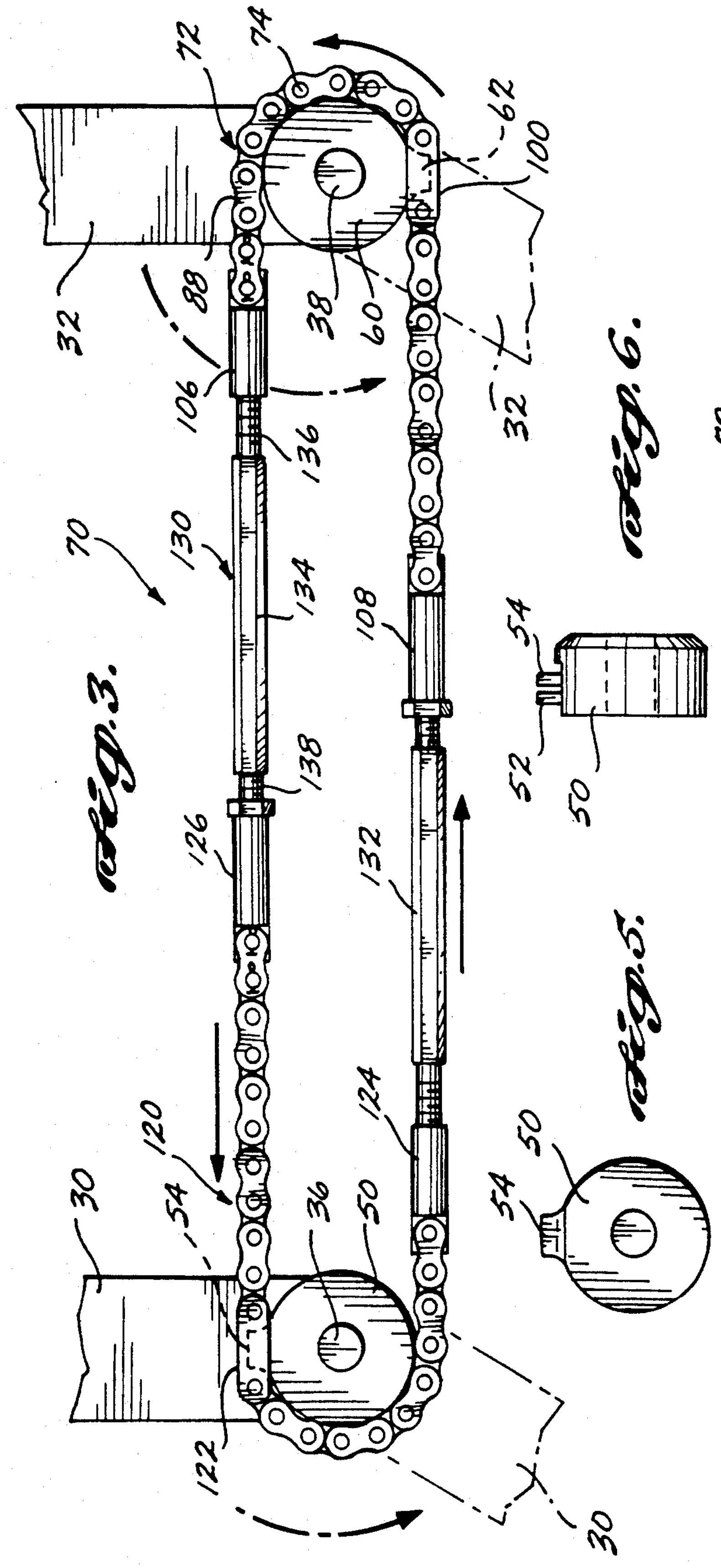
Fig. 3.
Fig. 6.
Fig. 5.
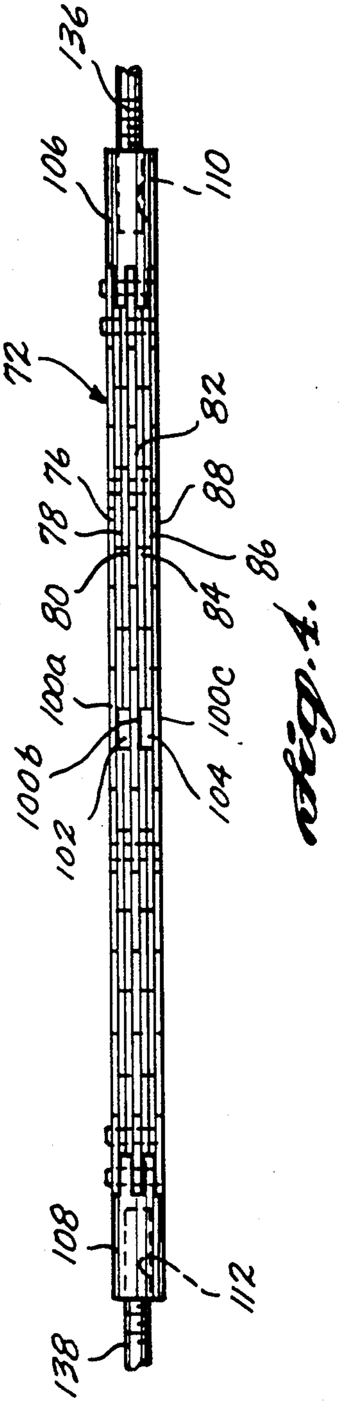
Fig. 4.

LEAF CHAIN DRIVE ASSEMBLY

FIELD OF THE INVENTION

This invention relates to improvements in platform lifts of the type used in buses and other vehicles, and more particularly to drive assemblies used in such lifts for causing the platform to raise and lower.

BACKGROUND OF THE INVENTION

Platform-type wheelchair lifts of the type disclosed in U.S. Pat. No. 4,058,228 to Hall have been used extensively in passenger vehicles, particularly urban buses. Platform lifts of the type disclosed in the Hall patent are typically installed in one of the existing stairwells in a vehicle. These lifts generally comprise a platform which is slidably mounted in the vehicle beneath the stairwell so as to define the bottom step of the stairwell when in the retracted position and so as to provide a platform which projects outwardly from the stairwell when in the extended position. The platform is attached via a parallelogram linkage assembly to a carriage. The latter is slidably mounted in a pair of opposing channel members and is caused to move between retracted and extended positions by a chain drive assembly which is actuated by a hydraulic or pneumatic linear actuator. The parallelogram linkage assembly is designed to cause the platform to move between upper and lower positions relative to the carriage when the platform is in the extended position. The parallelogram linkage includes two pairs of parallel linkage arms, each arm having a proximal end which is pivotally mounted to the carriage and a distal end which is pivotally mounted to the platform.

The linkage arms are caused to pivot about their proximal ends, thereby causing the platform to move between upper and lower positions, by a sprocket and chain drive assembly. This assembly includes a toothed driving sprocket coupled with the proximal end of one of the parallel arms so as to rotate with the arm and a driven toothed sprocket attached to the proximal end of the other arm so as to rotate with the arm. Rotational drive is transmitted from the driving sprocket to the driven sprocket by a chain drive assembly comprising a single length of roller chain. One end of the roller chain is wrapped partially around and is attached to the driving sprocket and the other end of the roller chain is wrapped partially around and is attached to the driven sprocket. The driving sprocket is driven by a separate chain and sprocket drive assembly which is actuated by a linear actuator. In an alternative embodiment of the above-described chain drive assembly, two lengths of roller chain are employed, each of which is wrapped around a respective one of the sprockets. Two turnbuckles are provided for coupling the ends of the roller chains together so as to form a continuous flexible drive member. A preload can easily be applied to chain assembly of the alternative embodiment by appropriate adjustment of the turnbuckles.

Platform lifts of the type described above have been used extensively in urban buses with very favorable results. Recently, the need has arisen (a) to increase the length of the parallel linkage arms of known platform lifts, (b) to increase the size and hence weight of the platform of known platform lifts, and (c) to accommodate heavier loads on known platform lifts. However, due to space limitations inherent in the design of the above-described platform lifts, it has not been possible to accommodate roller chain in the chain and sprocket drive assembly of such lifts of a size and hence strength sufficient to permit the lift to be modified in the manner described in the preceding sentence.

Under conventional operation, the parallel arms of platform lifts of the type disclosed in U.S. Pat. No. 4,058,228 are caused to travel between a downwardly projecting position, through a horizontal position, to an upwardly projecting position. As the arms travel through the horizontal position, the tendency exists for the platform of the lift to "buck" or bounce. Such "bucking" is believed to occur due to stretching of the inherently flexible roller chains used in the chain and sprocket drive assembly which arises when the load applied to the roller chains is shifted from the linkage assembly to the chains as the parallel arms move from the upwardly projecting to the downwardly projecting positions, or vice versa. As those who have experienced anomalous vibration or bouncing of elevators can appreciate, such "bucking" of the platform lift can be very disconcerting to a wheelchair occupant positioned on the lift.

In an attempt to minimize the "bucking" of the platform of conventional platform lifts which occurs as the parallel arms travel through the horizontal position, a significant preload has been applied to the roller chains. Although such preloading does reduce the tendency of the platform to "buck," it simultaneously increases the load on the bearings and the strain on the chain, sprockets, and other components of the chain and sprocket drive assembly. Also, the friction between movable components of the chain and sprocket drive assembly is increased as a consequence of such preloading. Such increases in load, strain, and friction result in added maintenance costs and reduced product longevity.

In fields of technology completely unrelated to platform lifts, leaf chains have been used for transmitting motion from one movable element to another. For instance, U.S. Pat. No. 4,197,766 discloses a counterbalanced pumping system comprising a vertically movable pump member, a counterweight, and a leaf chain supported on a plurality of pulleys for transmitting motion between the pumping member and the counterweight. U.S. Pat. No. 4,526,251 discloses a leaf chain designed for use in a lift truck for transmitting motion from one end of a hydraulic cylinder to the fork of the lift truck. In the chain drive assemblies of both U.S. Pat. Nos. 4,197,766 and 4,526,251, the ends of the leaf chains are secured to fixed or movable members, as the case may be, and the length of the leaf chains are supported by and pass back and forth over one or more sheaves or pulleys.

Although in general leaf chain is not designed to transmit positive drive, it is known to use leaf chain in this manner. U.S. Pat. No. 4,058,021 comprises a drive assembly comprising a leaf chain having link edges which engage specially formed flutes on an associated pulley. As indicated in U.S. Pat. No. 4,058,021, only a limited quantity of torque may be transmitted between the chain and pulley before the chain will slip with respect to the pulley.

It is also known to use chain in a spring-biased counterweight assembly for reducing the force required to raise a railroad passenger car stairway assembly. Such use of a chain is disclosed in U.S. Pat. No. 2,154,107, although the type of chain employed, i.e., roller versus leaf chain, is not disclosed.

Although the use of leaf chains in a wide range of mechanical contexts is well known, as evidenced by the patents discussed above, platform lifts of the type disclosed in U.S. Pat. No. 4,058,228 have, since their inception, suffered from the lack of chain strength and "bucking" problems discussed above. Such drawbacks of these platform lifts have gone uncorrected for over ten years, in spite of extremely widespread use of such platform lifts.

Thus, a strong need exists for a sprocket and chain drive assembly for causing the parallel arms of platform lifts of the type disclosed in U.S. Pat. No. 4,058,228 to Hall to move between the upper and lower positions which (a) is stronger than the sprocket and chain drive assemblies currently employed, (b) which does not cause the platform to "buck" as the parallel arms move through the horizontal position, and (c) which does not require excessive preloading of the roller chain links of the sprocket and chain drive assembly to avoid such "bucking" of the platform.

SUMMARY OF THE INVENTION

The present invention is a leaf chain drive assembly designed for use with a platform lift of the type comprising a platform, a carriage assembly, and a linkage assembly coupled with the platform and the carriage assembly for causing the platform to move upwardly and downwardly along a circular arc relative to the carriage. The linkage assembly comprises first and second linkage arms, with the proximal end of the first linkage arm being pivotally mounted to the carriage so as to be rotatable about a first axis and the proximal end of the second linkage arm being pivotally mounted to the carriage so as to be rotatable about a second axis. The leaf chain drive assembly comprises first sheave and second sheaves, each comprising a radially projecting lug. The first sheave is coupleable with the first linkage arm so as to rotate with the first linkage arm about the first axis, and the second sheave is coupleable with the second linkage arm so as to rotate with the second linkage arm about the second axis. The leaf chain drive assembly also comprises two leaf chains which are coupled together so as to surround and engage the first and second sheaves. The leaf chains each comprise an extended connecting link designed to engage the radially projecting lugs on the first and second sheaves so as to permit rotational drive to be transmitted between the the first and second sheaves and the leaf chains.

The leaf chain drive assembly further comprises a third sheave coupled to rotate with the first sheave, and a third leaf chain wrapped around the third sheave. One end of the third leaf chain is attached to the third sheave and the other end of the third leaf chain is attached to a linear actuator. As the linear actuator causes the other end of the third leaf chain to reciprocate, the third leaf chain will cause the third sheave to rotate, thereby imparting rotational drive to the first sheave which is coupled with the third sheave.

BRIEF DESCRIPTION OF THE DRAWINGS

FIG. 3 is a side elevational view of the chain and sprocket drive assembly with the parallel arms of the platform lift which are driven by the chain and sprocket drive assembly being shown in solid view in an upwardly projecting position and in phantom view in a downwardly projecting position;

FIG. 4 is a top view of one of the lengths of leaf chain used in the chain and sprocket drive assembly, with the chain being spread out flat for clarity of illustration;

FIG. 5 is a side elevation view of one of the sprockets used in the leaf and chain drive assembly; and FIG. 6 is a front elevational view of the sprocket illustrated in FIG. 5.

DETAILED DESCRIPTION OF THE PREFERRED EMBODIMENT

Figure 1:
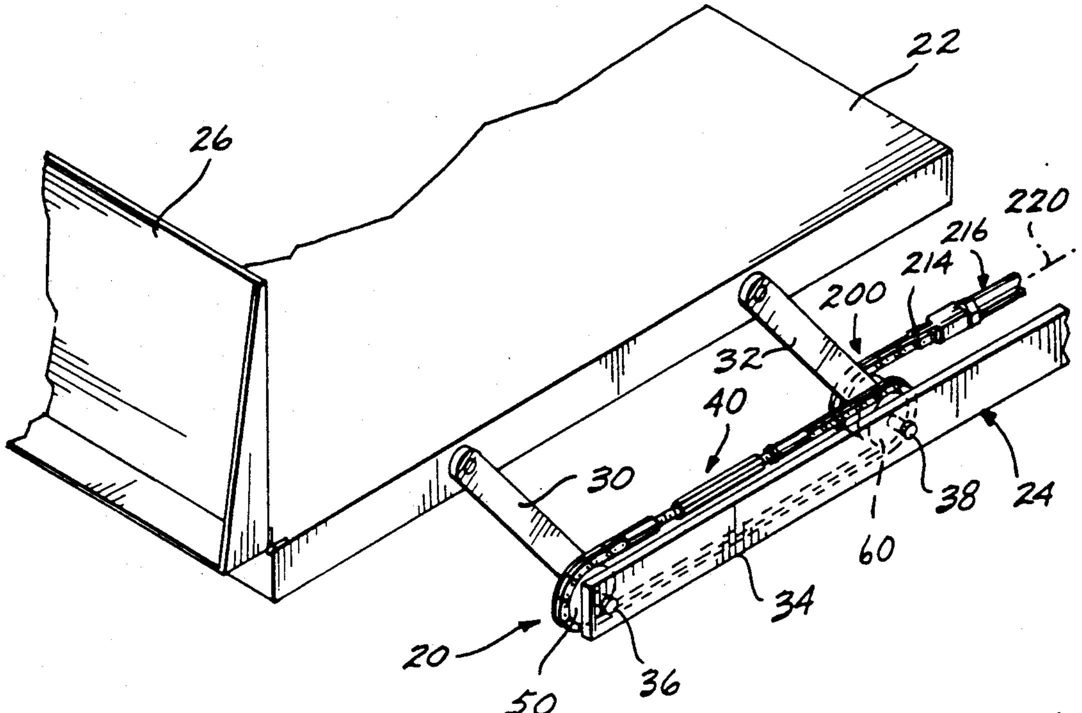
FIG. 1 is a fragmented, perspective view of a portion of a platform lift incorporating the chain and sprocket drive assembly of the present invention, with the parallel arms of the lift being shown in the upwardly projecting position.

The present invention is a leaf chain drive assembly 20 which is designed to replace roller chain drive assemblies of the type used in platform lifts disclosed in U.S. Pat. No. 4,058,228 to Hall, which lifts shall be referred to hereinafter as "platform lifts." FIG. 1 illustrates a conventional platform lift and one embodiment of the leaf chain drive assembly of the present invention incorporated in such lift. As described in detail in U.S. Pat. No. 4,058,228, which is incorporated herein by reference, and as illustrated in FIG. 1, conventional platform lifts include a platform 22 for supporting a passenger such as a wheelchair occupant, and a carriage, one portion of which is identified at 24, for causing the platform to move horizontally between the retracted and extended positions. Platform lifts also typically include a barrier 26 which is pivotally mounted to the outboard end of platform 22. Barrier 26 forms the bottom step in the stairwell in which the platform lift is mounted when the lift is in the retracted position. When the lift is in the extended position, barrier 26 is typically maintained in the position illustrated in FIG. 1 so as to prevent a wheelchair positioned on platform 22 from rolling off the platform.

Platform lifts further comprise a parallelogram linkage assembly for causing platform 22 to move upwardly and downwardly along a circular arc when the platform is in the extended position. This linkage assembly comprises two pairs of parallel arms, one pair of which is illustrated in FIG. 1 and comprises linkage arms 30 and 32. The proximal ends (i.e., the lower ends as illustrated in FIG. 1) of linkage arms 30 and 32 are keyed to pivot shafts 36 and 38, respectively, which shafts are pivotally mounted in spaced relation to carriage bar 34. As a consequence of this arrangement, the proximal ends of linkage arms 30 and 32 are coupled to carriage 34 so as to rotate about the pivot axes of pivot shafts 36 and 38, respectively. The distal ends (i.e., the upper ends as illustrated in FIG. 1) of linkage arms 30 and 32 are pivotally mounted to platform 22 so that the spacing between the distal ends of the arms is identical to the spacing between the proximal ends of the arms.

As described in detail below, leaf chain drive assembly 20 is designed to cause linkage arms 30 and 32 to pivot with pivot shafts 36 and 38, respectively, about the pivot axes of the shafts, thereby causing platform 22 attached to arms 30 and 32 to raise and lower. As described below, leaf chain drive assembly 20 includes slave chain drive assembly 40 and lift chain drive assembly 200 for causing arms 30 and 32 to pivot in this manner.

Referring to FIGS. 1-6, slave chain drive assembly 40 comprises a driven sheave or pulley 50 having identically sized and shaped lugs 52 and 54 which are spaced apart from one another a predetermined distance and project along a common radius of the sheave a predetermined distance from the outer circumferential edge of the sheave 50. The specific size, configuration, and relative spacing of projecting lugs 52 and 54 will be described in greater detail below in connection with the description of leaf chain 120. Sheave 50 is keyed to pivot shaft 36 so as to rotate with the pivot shaft.

Slave chain drive assembly 40 includes a driving sheave 60 which preferably has a size and configuration identical to that of sheave 50. Thus, sheave 60 includes a pair of axially spaced, radially projecting lugs, one of which is identified in phantom at 62 in FIG. 3, which are identical to lugs 52 and 54 of sheave 50. Sheave 60 is keyed to pivot shaft 38 so as to rotate with the pivot shaft.

Assembly 40 comprises an endless drive assembly 70 for transmitting rotational drive from driving sheave 60 to driven sheave 50. In the preferred embodiment, drive assembly 70 comprises a leaf chain 72. Leaf chain 72 is a so-called "3-4" leaf chain comprising a plurality of rigid plates which are interconnected by pins 74. More specifically, moving from the top to the bottom of leaf chain 72 illustrated in FIG. 4, the leaf chain comprises outer plates 76, intermediate plates 78 and 80, central plates 82, intermediate plates 84 and 86, and outer plates 88. The ends of each outer plate 76 are aligned with the ends of a corresponding respective inner plate 82 and a corresponding respective outer plate 88. Similarly, the ends of a given set of intermediate plates 78, 80, 84, and 86 are aligned with one another. In addition, each set of intermediate plates 78, 80, 84, and 86 is offset one pitch from the associated set of outer, central, and outer plates 76, 82, and 88. This design of leaf chain 72 is preferred, although it is to be appreciated that leaf chains having differing plate configurations may also be satisfactorily employed, the only requirement being that the leaf chain have sufficient strength and stiffness for the intended application, and the cross sectional size of the leaf chain is such that it can be accommodated in the space provided in the platform lift.

Leaf chain 72 also comprises an extended connecting link 100 which is preferably, although not necessarily, positioned at or near the middle of the length of the leaf chain. The extended connecting link comprises an outer plate 100*a* which is positioned along the plane of outer plates 76, an intermediate plate 100*a* which is positioned along the plane of central plates 82, and an outer plate 100*c* which is positioned along the plane of the outer plates 88. With this design of connecting link 100, apertures 102 and 104 are provided in leaf chain 72, which apertures extend entirely through the thickness of the chain. Apertures 102 and 104 in leaf chain 72 are sized and configured, as are the radially projecting lugs (one of which is identified at 62 in FIG. 3) of sheave 60, so that the radially projecting lugs may be received in apertures 102 and 104 with a close sliding fit, whereby rotational motion may be transmitted from sheave 60 to leaf chain 72 without any lost motion.

Leaf chain 72 additionally comprises end fitting 106 which is attached to one end of the leaf chain and end fitting 108 which is attached to the other end of the leaf chain. End fitting 106 comprises a threaded central bore 110 (FIG. 4) having a left hand thread, and end fitting 108 comprises a threaded central bore 112 (FIG. 4) having a right hand thread.

Endless drive belt assembly 70 additionally comprises a second leaf chain 120. Leaf chain 120 is identical to leaf chain 72, and hence comprises an extended connecting link 122 which is identical to connecting link 100, and end fittings 124 and 126 which are identical to end fittings 106 and 108, respectively. Thus, connecting link 122 is designed to receive lugs 52 and 54 of sheave 50 such that motion may be transmitted from the leaf chain to the sheave.

Drive belt assembly 70 further comprises connecting shafts 130 and 132. Shaft 130 comprises a central portion 134 having a hexagonal cross-sectional configuration and threaded ends 136 and 138. Threaded end 136 has a left hand thread and the pitch of the thread is selected so that end 136 may be threadably engaged in threaded bore 110 in end fitting 106 of leaf chain 72. End 138 has a right hand thread and the thread pitch of the end is selected so that it may be threadably engaged in the central bore in end fitting 126 of leaf chain 120. Connecting shaft 132 has a similar construction with the end having a right handed thread being threadably engaged in central bore 112 in end fitting 108 of leaf chain 72, and the end having a left hand thread being threadably engaged in the central bore of end fitting 124 of leaf chain 120.

Figure 2:
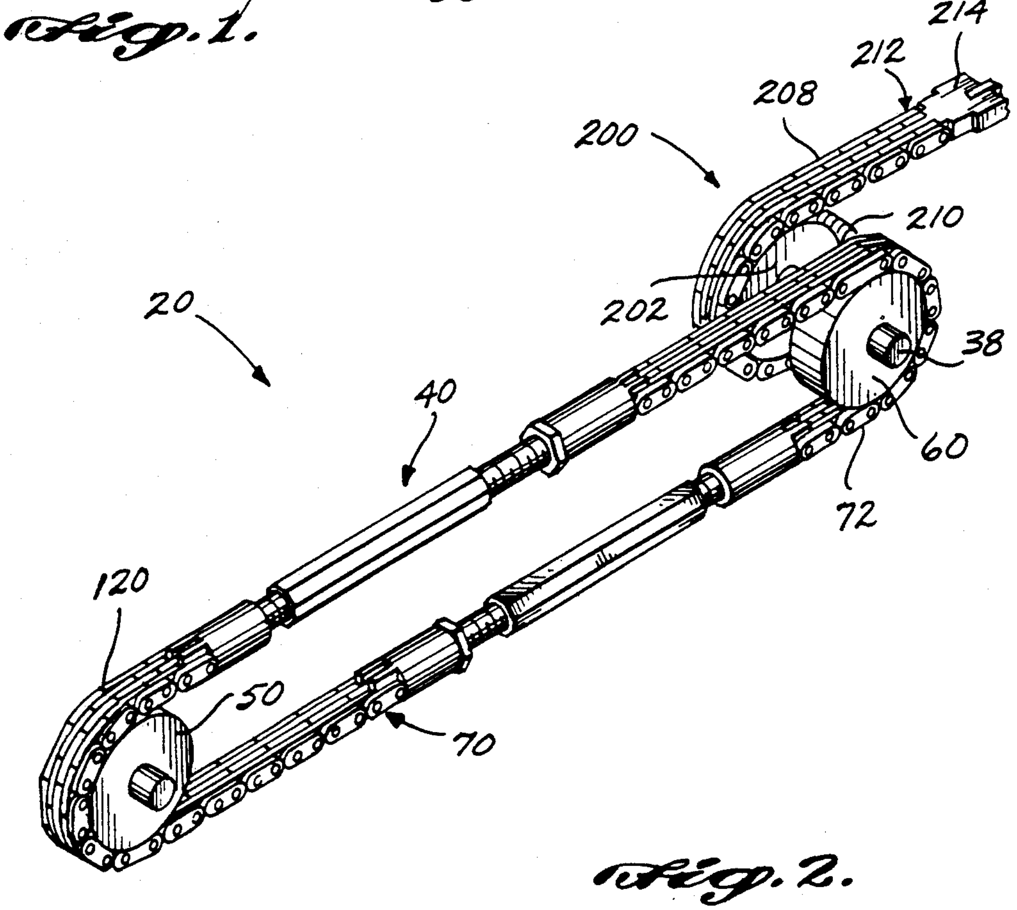
FIG. 2 is an enlarged perspective view of the chain and sprocket drive assembly illustrated in FIG. 1, with associated portions of the platform lift being removed for clarity of illustration.

Referring to FIGS. 1 and 2, the leaf chain drive assembly 20 further comprises a lift chain drive assembly 200 for causing sheave 60 to rotate. The lift chain drive assembly comprises a sheave 202 which is keyed to pivot shaft 38 so as to rotate with the shaft. As illustrated in FIG. 1, linkage arm 32 is positioned between sheave 202 and sheave 60, whereby sheave 202, linkage arm 32, and sheave 60 rotate as a unit about the rotational axis of pivot shaft 38.

Lift chain assembly 200 further comprises leaf chain 208. The latter is preferably a "3-4" leaf chain of the type used for leaf chains 72 and 120, as described above, except that the size and strength of leaf chain 208 is increased as required to permit leaf chain 208 to withstand the substantially greater forces to which it is subjected. End 210 of leaf chain 208 is affixed to sheave 202 by conventional means so that the end of the leaf chain will rotate with the sheave. In one embodiment of the invention, sheave 202 comprises a pair of radially projecting lugs (not shown) similar to lugs 52 and 54 on sheave 50 as described above. End 210 of leaf chain 208 is then attached to these projecting lugs via a pin (not shown). The opposite end 212 of leaf chain 208 is attached via fitting 214 to linear actuator 216. The latter is provided for causing leaf chain 208 to move back and forth so as to wrap around an unwrap from the periphery of sheave 202, thereby causing the pivot sheave to rotate about its rotational axis. Linear actuator 216 is identical to the corresponding linear actuator used in the platform lift described in U.S. Pat. No. 4,058,228. Linear actuator 216 is designed to cause end 212 of leaf chain 208 to move back and forth along actuation axis 220. For a more detailed description of linear actuator 216, attention is directed to the aforementioned patent.

In connection with the following discussion of the operation of leaf chain drive assembly 20, reference should be made to FIGS. 1-6. Initially, end 210 of leaf chain 208 is attached to sheave 202, the leaf chain is wrapped around sheave 202 in the manner illustrated in FIGS. 1 and 2, and end 212 of leaf chain 200 is attached via fitting 214 to linear actuator 216. Leaf chain 72 is wrapped around sheave 60 so that the radially projecting lugs of sheave 60 (one of which is identified at 62 in FIG. 3) are received in apertures 102 and 104 in the leaf chain. Leaf chain 120 is wrapped around sheave 50 in a similar manner so that radially projecting lugs 52 and 54 are received in the apertures of connecting link 122. Connecting shaft 130 is then threadably engaged with end fittings 106 and 126, and connecting shaft 132 is threadably engaged with end fittings 108 and 124. The connecting shafts are then tightened just enough to remove all slack from leaf chains 72 and 120. A significant preload does not have to be applied to leaf chains 72 and 120, as is typically required with the two-chain alternative embodiment (discussed above) of the chain drive assembly used with known platform lifts.

In connection with the following discussion, it is assumed that parallel linkage arms 30 and 32 are in the upwardly extending position illustrated in FIG. 1. When it is desired to move platform 22 to a more elevated position with respect to carriage 24, linear actuator 216 is actuated so as to cause end 212 of leaf chain 200 to move inwardly (i.e., to the right as illustrated in FIG. 1) along the actuation axis 220 of the linear actuator 216. As leaf chain 200 moves in this direction, it causes sheave 202 to rotate in the clockwise direction as illustrated in FIGS. 1 and 2. This clockwise rotation is transmitted via pivot shaft 38 to sheave 60 so as to cause the latter to also rotate in a clockwise direction. Additionally, rotation of sheave 202 in a clockwise direction is transmitted via pivot shaft 38 to linkage arm 32 so as to cause the pivot arm to move upwardly and in a clockwise direction about the rotational axis of pivot shaft 38.

Rotation of sheave 60 in a clockwise direction is transmitted via its radially projecting lugs, e.g., lug 62, to leaf chain 72 so as to cause the portion of the leaf chain wrapped around sheave 60 to also rotate in the clockwise direction. Such motion of leaf chain 72 is transmitted via connecting shafts 130 and 132 to leaf chain 120, thereby causing the portion of leaf chain 120 wrapped around sheave 50 to rotate in a clockwise direction. Such movement of leaf chain 120 is transmitted via its connecting link 122 to projecting lugs 52 and 54 and hence to sheave 50 so as to cause sheave 50 to rotate in a clockwise direction. This rotation of sheave 50 is transmitted via pivot shaft 36 to linkage arm 30 so as to cause the linkage arm to rotate about the rotational axis of pivot shaft 36. Thus, when sheave 202 is driven in the clockwise direction, linkage arms 30 and 32 are caused to move along a circular arc in a clockwise direction so as to cause platform 22 to raise relative to carriage 24.

On the other hand, when it is desired to lower platform 22 with respect to carriage 24 linear actuator 216 is operated so as to cause end 212 of leaf chain 200 to move outwardly (to the left as illustrated in FIG. 1) along actuation axis 220. Such movement of sheave 202 causes linkage arms 30 and 32 to move in a counterclockwise direction along a circular arc so as to cause platform 22 to move outwardly and downwardly with respect to carriage 24. As a consequence of the mechanical interconnection provided by a slave chain drive assembly 40, linkage arms 30 and 32 are permitted to move downwardly in a parallel simultaneous fashion.

While the preferred method for connecting sheaves 50 and 60 with drive belt assembly 70 comprises the connecting link and radially projecting lug arrangement described above, it is to be appreciated that other approaches for achieving such connection between the leaf chains and the sheaves also fall within the scope of the present invention.

As illustrated and described above, a leaf chain drive assembly 20 is typically provided on only one side of platform 22. However, in certain operating environments, it may be desirable to provide an assembly 20 on each side of platform 22.

The slave chain drive assembly 70 and lift chain drive assembly 200 of the present invention possess several important advantages over the corresponding roller chain drive assemblies of the platform lift disclosed in U.S. Pat. No. 4,058,228. The cross-sectional size of leaf chains 72, 120, and 200 is similar to that of the corresponding roller chains used in the platform lift described in U.S. Pat. No. 4,058,228 due to size constraints imposed by the environment in which the leaf chains are used. However, leaf chains 72, 120, and 200 are significantly stronger than their roller chain counterparts due to the inherently greater tensile strength of leaf chains. Consequently, the slave chain drive assembly 70 and leaf chain drive assembly 200 enjoy a significantly greater margin of safety than their roller chain counterparts used in the platform lift described in U.S. Pat. No. 4,058,228.

Although it is fairly widely known by those of ordinary skill in the art that a leaf chain of a given size has greater tensile strength than a comparably sized roller chain, few ordinary practitioners, even those specializing in the narrow art of chain engineering, appreciate that leaf chains are also stiffer than roller chains of corresponding cross-sectional size. Such additional stiffness is responsible for the dramatic improvement in the operation of platform lifts incorporating the slave and leaf chain drive assemblies of the present invention. More specifically, by utilizing relatively stiff leaf chains in place of their relatively flexible roller chain equivalents, the tendency of platform 22 to "buck" or bounce as parallel linkage arms 30 and 32 are caused to rotate through the horizontal position is eliminated. Elimination of such motion enhances significantly a user's sense of security when riding up or down on platform 22. Moreover, because the leaf chains of assemblies 70 and 200 do not have to be preloaded to the extent required with their roller chain counterparts used in the platform lift of U.S. Pat. No. 4,058,228, the maintenance requirements for the linkage assembly of the platform lift are reduced significantly and the longevity of the various components of the platform lift is increased significantly.

Since certain changes may be made in the above apparatus without departing from the scope of the invention herein involved, it is intended that all matter contained in the above description or shown in the accompanying drawings shall be interpreted in an illustrative and not in a limiting sense.

The embodiments of the invention in which an exclusive property or privilege is claimed are defined as follows:

1. A leaf chain drive assembly for use with a platform lift of the type comprising a platform, a carriage assembly, and a linkage assembly coupled with the platform and the carriage assembly for causing the platform to move upwardly and downwardly along a circular arc relative to the carriage, the linkage assembly comprising first and second linkage arms, the proximal end of the first linkage arm being pivotably mounted to the carriage so as to be rotatable about a first axis and the proximal end of the second linkage arm being pivotally mounted to the carriage so as to be rotatable about a second axis, the leaf chain drive assembly comprising:

a first sheave coupleable with the first linkage arm so as to rotate with the first linkage arm about the first axis when the first linkage arm is caused to rotate about the first axis;

a second sheave coupleable with the second linkage arm so as to rotate with the second linkage arm about the second axis when the second linkage arm is caused to rotate about the second axis; and leaf chain means attached to said first and second sheaves for transmitting rotational drive between said first and second sheaves, said leaf chain means comprising a first leaf chain;

wherein said first leaf chain comprises a connecting link and said first sheave includes a radially projecting lug designed to engage said connecting link so as to permit rotational drive to be transmitted between said first leaf chain and said first sheave when said first leaf chain is wrapped around said first sheave so that said lug engages said connecting link.

2. An assembly according to claim 1, wherein said leaf chain means additionally comprises a second leaf chain comprising a connecting link, and said second sheave includes a radially projecting lug designed to engage said connecting link so as to permit rotational drive to be transmitted between said second leaf chain and said second sheave when said second leaf chain is wrapped around said second sheave so that said lug engages said connecting link.

3. An assembly according to claim 2, wherein said leaf chain means comprises connecting means for connecting together ends of said first and second leaf chains so as to form a continuous drive element.

4. A passenger lift designed for installation in the entry way of a passenger vehicle, the lift comprising:

a platform;

carriage means coupled with the platform for causing the platform to move between a retracted position and an extended position;

linkage means coupled to the platform and the carriage means for causing the platform to move upwardly and downwardly along a circular arc relative to the carriage means when the platform is in the extended position, the linkage means comprising first and second linkage arms, one end of said first linkage arm being pivotally mounted to the carriage means so as to be rotatable about a first axis and one end of said second linkage arm being pivotally mounted to the carriage means so as to be rotatable about a second axis;

a first sheave coupled to said one end of said first linkage arm so as to rotate with said first linkage arm about said first axis;

a second sheave coupled to said one end of said second linkage arm so as to rotate with said second linkage arm about said second axis; and leaf chain means for transmitting rotational drive from said first sheave to said second sheave, said leaf chain means comprising at least one leaf chain;

wherein said first and second sheaves comprise, respectively, first and second radially projecting lugs, and said at least one leaf chain comprises first and second leaf chains, said first leaf chain comprising a first connecting link for engaging said first lug so as to permit rotational drive to be transmitted between said first sheave and said first leaf chain, and said second leaf chain comprising a second connecting link for engaging said second lug so as to permit rotational drive to be transmitted between said second sheave and said second leaf chain.

5. A leaf chain drive assembly comprising:

a driving sheave having a radially projecting first lug;

a driven sheave having a radially projecting second lug;

an endless drive chain assembly attached to said driving and driven sheaves for transmitting rotational drive from said driving sheave to said driven sheave, said drive chain assembly including leaf chain means having a first connecting link with an aperture sized and configured to receive said first lug for permitting rotational drive to be transmitted from said driving sheave and a second connecting link with an aperture sized and configured to receive said second lug for permitting rotational drive to be transmitted to said driven sheave.

* * * * *